(12) United States Patent
Kim et al.

(10) Patent No.: US 11,131,901 B2
(45) Date of Patent: Sep. 28, 2021

(54) PORTABLE ELECTRONIC DEVICE AND CAMERA MODULE

(71) Applicant: SAMSUNG ELECTRO-MECHANICS CO., LTD., Suwon-si (KR)

(72) Inventors: Jung Woo Kim, Suwon-si (KR); Young Bok Yoon, Suwon-si (KR); Hong Joo Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 182 days.

(21) Appl. No.: 16/528,804

(22) Filed: Aug. 1, 2019

(65) Prior Publication Data

US 2020/0272027 A1    Aug. 27, 2020

(30) Foreign Application Priority Data

Feb. 21, 2019    (KR) .................. 10-2019-0020621

(51) Int. Cl.
*G02B 7/02* (2021.01)
*G03B 13/32* (2021.01)
*G02B 7/04* (2021.01)

(52) U.S. Cl.
CPC ............. *G03B 13/32* (2013.01); *G02B 7/04* (2013.01)

(58) Field of Classification Search
CPC    G03B 13/32; G03B 30/00; G03B 2205/0069; G03B 3/10; G03B 13/36; G02B 7/04; G02B 7/08
USPC .................................................. 359/819–823
See application file for complete search history.

(56) References Cited

U.S. PATENT DOCUMENTS

2018/0356609 A1* 12/2018 Kim .................. G03B 13/34

FOREIGN PATENT DOCUMENTS

| JP | 4390347 B2 | 12/2009 |
|---|---|---|
| KR | 10-2017-0109193 A | 9/2017 |
| KR | 10-2018-0112689 A | 10/2018 |

* cited by examiner

*Primary Examiner* — James C. Jones
(74) *Attorney, Agent, or Firm* — NSIP Law

(57) ABSTRACT

A camera module includes a carrier accommodating a lens module, a housing accommodating the lens module and the carrier, a focus adjusting unit configured to move the lens module and the carrier in an optical axis direction, and a position measuring unit including a sensing yoke mounted on the carrier and a sensing coil facing the first sensing yoke. The sensing yoke includes a body unit and an extension unit extending in the optical axis direction from the body unit.

20 Claims, 7 Drawing Sheets

PORTABLE ELECTRONIC DEVICE AND CAMERA MODULE

CROSS-REFERENCE TO RELATED APPLICATIONS

This application claims the benefit under 35 U.S.C. 119(a) of Korean Patent Application No. 10-2019-0020621 filed on Feb. 21, 2019, in the Korean Intellectual Property Office, the entire disclosure of which is incorporated herein by reference for all purposes.

BACKGROUND

1. Field

The present disclosure relates to a portable electronic device and a camera module.

2. Description of the Background

Recently, camera modules have been employed in mobile communication terminals such as tablet PCs, laptop computers, and the like, as well as in smartphones.

In addition, an autofocusing function and an optical image stabilization function have been provided in camera modules, and a component for measuring a position of a lens has been added to perform a precise control. A hall sensor is generally used as a component for measuring the position of a lens.

Recently, in accordance with the trend for miniaturization of mobile communication terminals and camera modules, the sizes of actuators for autofocusing and optical image stabilization have been reduced; however, it is difficult to reduce the sizes of actuators due to hall sensors.

In addition, there is a problem that a manufacturing cost of a camera module may increase when a hall sensor is used.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a carrier accommodating a lens module, a housing accommodating the lens module and the carrier, a focus adjusting unit configured to move the lens module and the carrier in an optical axis direction, and a position measuring unit including a sensing yoke disposed on the carrier and a sensing coil facing the sensing yoke, wherein the sensing yoke includes a body unit and an extension unit extending in the optical axis direction from the body unit.

The sensing yoke may be made of stainless steel (SUS).

A height of the body unit in the optical axis direction may be less than a length of the body unit in a direction perpendicular to the optical axis direction.

The sensing coil may include a first coil and a second coil disposed along the optical axis direction.

A height of the body unit in the optical axis direction may be less than a spacing distance between a hollow unit of the first coil and a hollow unit of the second coil in the optical axis direction.

A height of the body unit in the optical axis direction may be less than half a height of at least one of the first coil and the second coil in the optical axis direction.

The extension unit may include a first extension unit extending from one side of the body unit in the optical axis direction, and a second extension unit extending from another side of the body unit in the optical axis direction.

A distance between the first extension unit and the second extension unit may be greater than a length of at least one of a hollow unit of the first coil and a hollow unit of the second coil in a direction perpendicular to the optical axis direction.

A length of the first extension unit in a direction perpendicular to the optical axis and a length of the second extension unit in a direction perpendicular to the optical axis may each be greater than at least one of a length between an inner side end and an outer side end of the first coil and a length between an inner side end and an outer side end of the second coil.

A portion of the first extension unit and a portion of the second extension unit may be disposed to face a hollow unit of the first coil and a hollow unit of the second coil.

When viewed from a direction perpendicular to the optical axis direction, the sensing yoke may have an 'H' shape.

A portable electronic device may include the camera module, which may further include an image sensor configured to convert light incident through a lens barrel disposed in the lens module to an electrical signal, and the portable electronic device may include a display unit disposed on a surface of the portable electronic device to display an image based on the electrical signal.

In another general aspect, a camera module includes a carrier accommodating a lens module, a housing accommodating the lens module and the carrier, a focus adjusting unit including a magnet disposed on the carrier and a coil disposed to face the magnet, and a position measuring unit including a sensing yoke disposed on the carrier and a sensing coil disposed to face the sensing yoke, wherein the sensing coil includes a first coil and a second coil disposed along an optical axis direction, wherein the sensing yoke includes a body unit and an extension unit extending from one side and another side of the body unit in the optical axis direction, respectively, and wherein a portion of the extension unit is disposed to face the first coil, and another portion of the extension unit is disposed to face the second coil.

A height of the body unit in the optical axis direction may be less than half a height of at least one of the first coil and the second coil in the optical axis direction.

The extension unit may include a first extension unit extending from the one side of the body unit in the optical axis direction and a second extension unit extending from the other side of the body unit in the optical axis direction, and a portion of the first extension unit and a portion of the second extension unit may each be disposed to face a hollow unit of the first coil and a hollow unit of the second coil.

An area of the first extension unit facing a hollow unit of the first coil and a hollow unit of the second coil may be less than half the area of the first extension unit, and an area of the second extension unit facing the hollow unit of the first coil and the hollow unit of the second coil may be less than half the area of the second extension unit.

The camera module may be a portable electronic device, and may further include an image sensor configured to convert light incident through a lens barrel disposed in the lens module to an electrical signal, and a display unit disposed on a surface of the portable electronic device to display an image based on the electrical signal.

In another general aspect, a portable electronic device includes a lens module movable in a first direction, an image sensor configured to convert light incident through a lens barrel disposed in the lens module to an electrical signal, a display unit disposed on a surface of the portable electronic device to display an image based on the electrical signal, a sensing yoke disposed on the lens module, and a sensing coil disposed to face the sensing yoke, wherein the sensing yoke includes a body unit extending in a second direction perpendicular to the first direction, and an extension unit extending from the body unit in the first direction.

The lens barrel may include an optical axis and one of the first direction and the second direction may be in the optical axis direction.

The extension unit may include a first extension unit on one side of the body unit and another extension unit spaced apart in the second direction from the first extension unit on another side of the body unit, and the sensing coil may include a first coil and a second coil disposed along the first direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
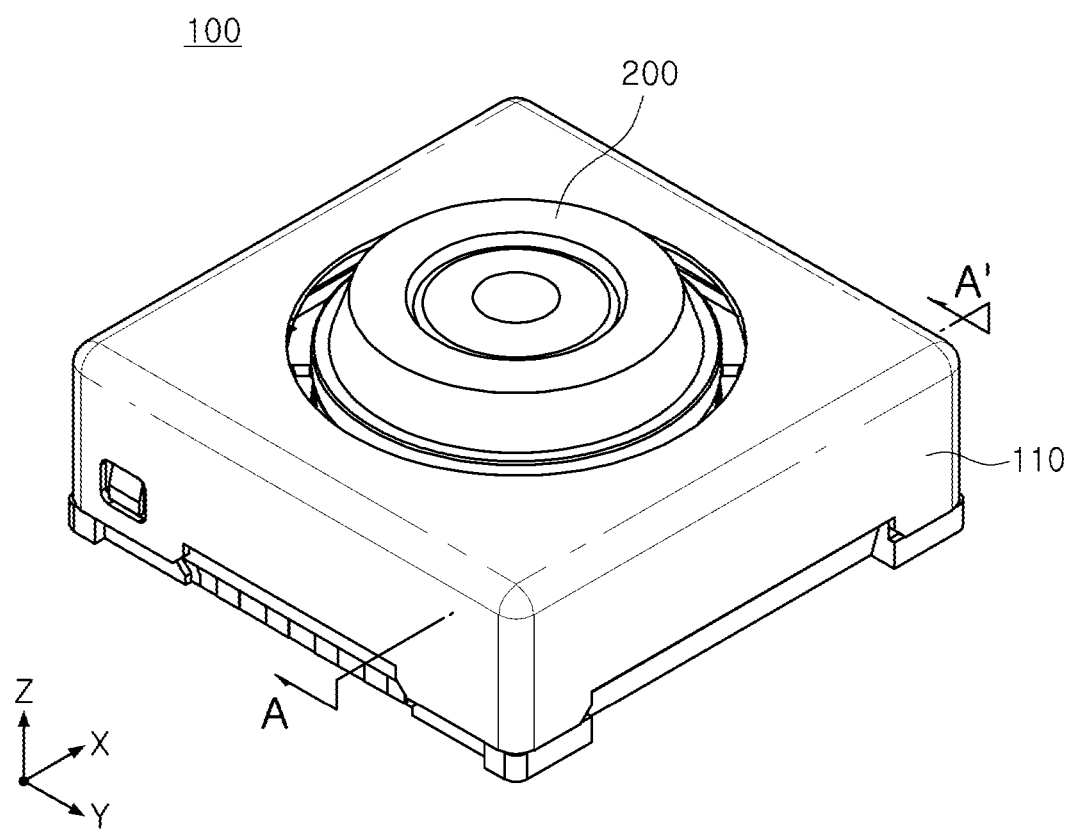
FIG. 1 is a perspective view of a camera module according to one or more examples.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

One or more examples of the present disclosure describe a camera module capable of precisely measuring a position of a lens module while miniaturizing the camera module. The present disclosure relates to a camera module, and may be a portable electronic device such as a mobile communication terminal, a smartphone, a tablet PC, and the like.

Figure 2:
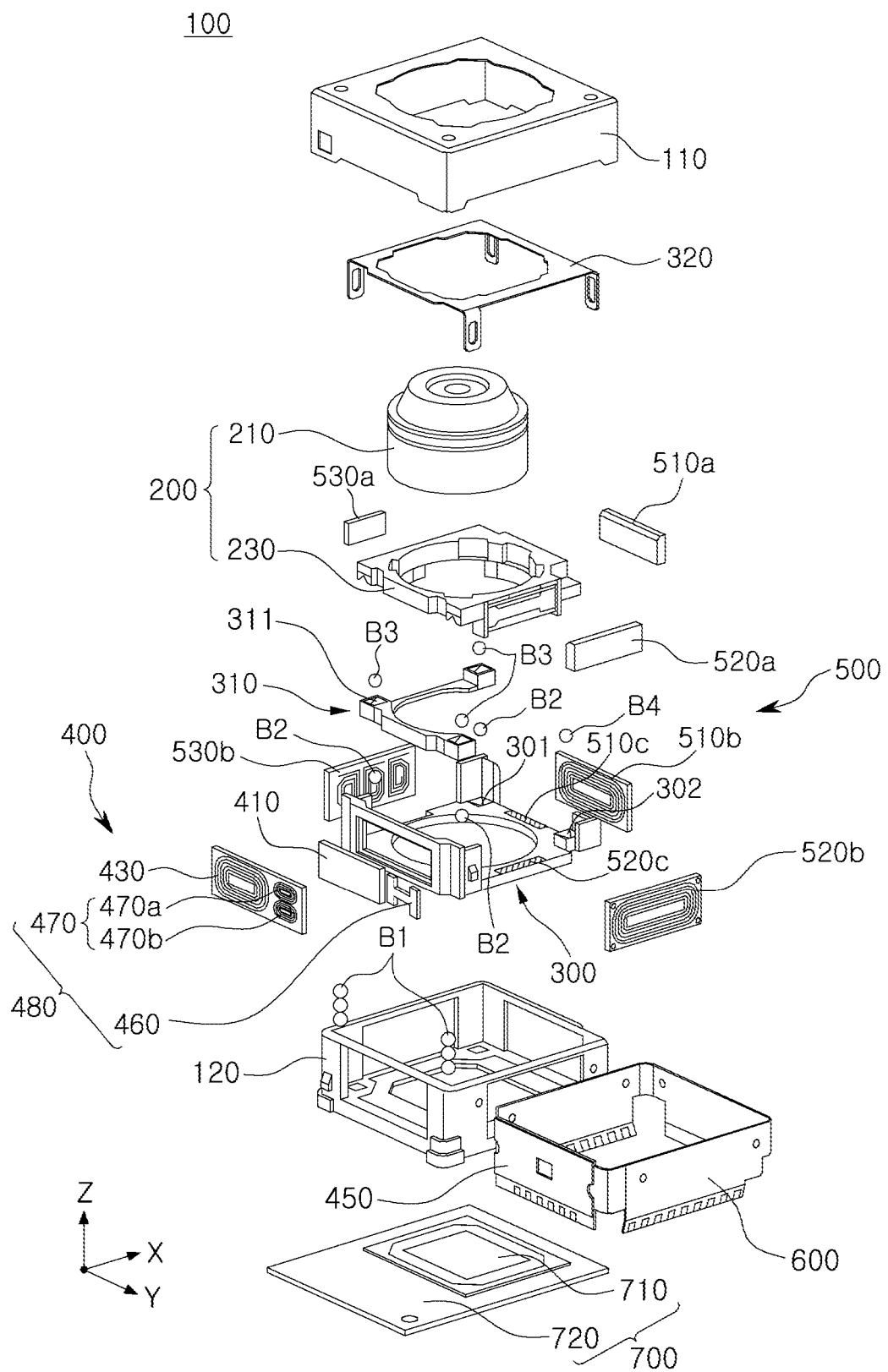
FIG. 2 is a schematic exploded perspective view of a camera module according to one or more examples.

FIG. 1 is a perspective view of a camera module according to one or more examples, and FIG. 2 is a schematic exploded perspective view of a camera module according to one or more examples.

Referring to FIGS. 1 and 2, a camera module 100 according to one or more examples may include a lens module 200, a lens driving device moving the lens module 200, an image sensor module 700 converting light incident through the lens module 200, a housing 120 accommodating the lens module 200 and the lens driving device, and a case 110 coupled to the housing 120.

The lens module 200 may include a lens barrel 210 and a lens holder 230.

The lens barrel 210 may be provided with at least one lens capturing a subject. When a plurality of lenses are disposed, the plurality of lenses may be mounted inside the lens barrel 210 along an optical axis. The lens barrel 210 may have a hollow cylindrical shape, and may be coupled to the lens holder 230.

The lens driving device may be a device moving the lens module 200.

For example, the lens driving device may adjust a focus by moving the lens module 200 in an optical axis (Z-axis) direction, and may correct shaking at the time of photographing by moving the lens module 200 in a direction perpendicular to the optical axis (Z-axis).

The lens driving device may include a focus adjusting unit 400 adjusting a focus and an optical image stabilization unit 500 correcting shaking.

An image sensor module 700 may be a device converting light incident through the lens module 200 into an electric signal.

For example, the image sensor module 700 may include an image sensor 710 and a printed circuit board 720 connected to the image sensor 710, and may further include an infrared filter.

The infrared filter may serve to block light in an infrared region of the light incident through the lens module 200.

The image sensor 710 may convert the light incident through the lens module 200 into an electric signal. As an example, the image sensor 710 may be a charge coupled device (CCD) or a complementary metal-oxide semiconductor (CMOS).

Figure 7A:
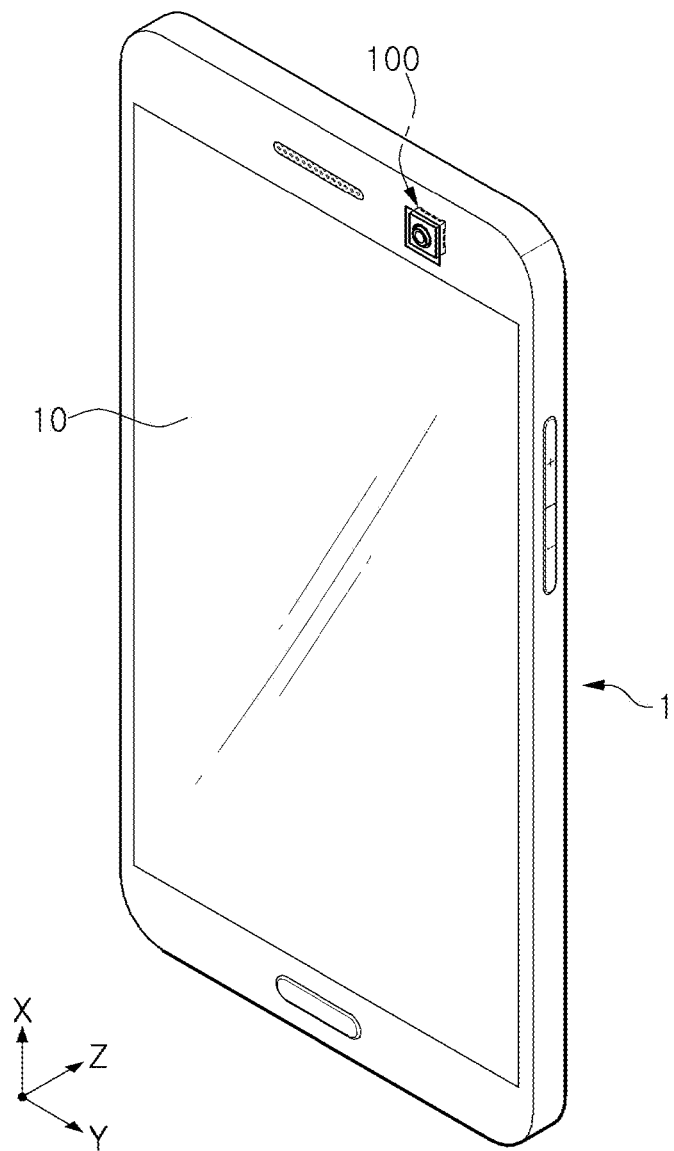
FIGS. 7A and 7B are perspective views illustrating one or more examples of a portable electronic device with an example camera module.

The electric signal converted by the image sensor 710 may be outputted as an image through a display unit 10 of a portable electronic device 1 (FIG. 7A).

The image sensor 710 may be fixed to the printed circuit board 720, and may be electrically connected to the printed circuit board 720 by wire bonding.

The lens module 200 and the lens driving device may be accommodated in the housing 120.

For example, the housing 120 may have open upper and lower units, and the lens module 200 and a lens driving device 400, 500 may be accommodated in an inner space of the housing 120.

The image sensor module 700 may be disposed on a lower unit of the housing 120.

A case 110 may be coupled to the housing 120 to surround an outer surface of the housing 120, and may serve to protect internal components of the camera module 100.

In addition, the case 110 may function to shield electromagnetic waves.

Figure 7B:
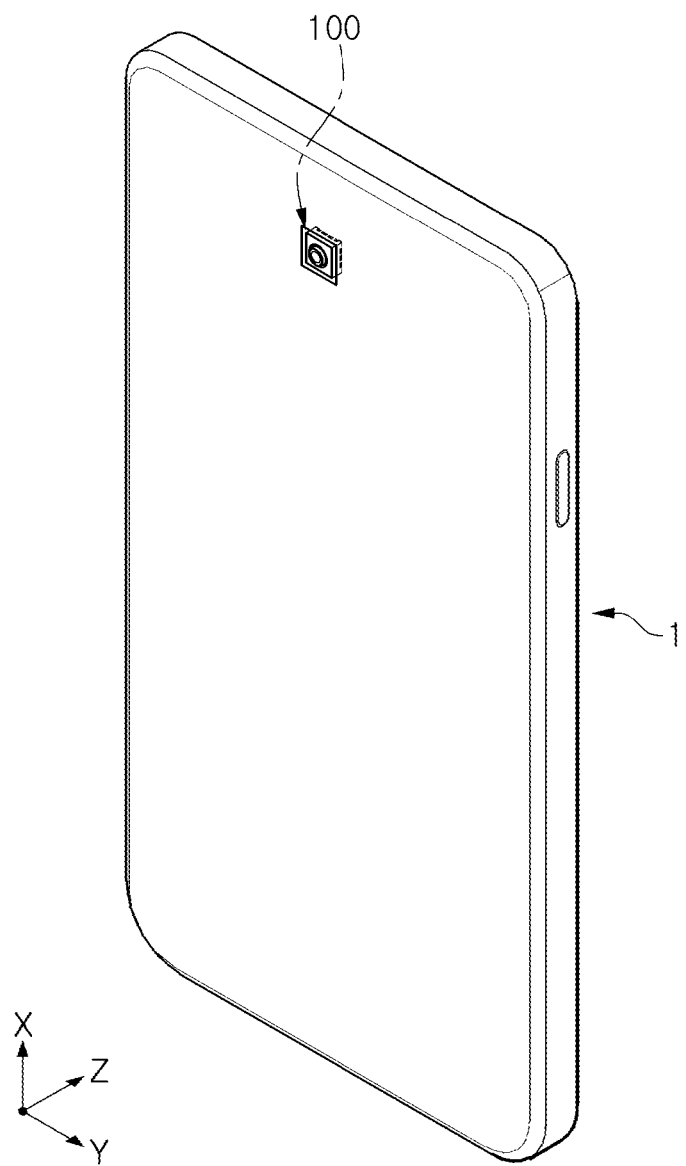

For example, the case 100 may shield electromagnetic waves such that the electromagnetic waves generated in the camera module do not affect other electronic components in the portable electronic device 1 (FIGS. 7A and 7B).

In addition, since various electronic components are mounted on the portable electronic device 1 in addition to the camera module, the case 110 may shield electromagnetic waves such that the electromagnetic waves generated from such electronic components do not affect the camera module.

The case 110 may be made of a metal material to be grounded to a ground pad provided on the printed circuit board 720, thereby shielding electromagnetic waves.

Referring to FIG. 2, a focus adjusting unit 400 of the lens driving device according to one or more examples will be described.

In the lens driving device according to one or more examples, a lens module 200 may be moved to focus on the subject.

As an example, in the examples described herein, the focus adjusting unit 400 moving the lens module 200 in an optical axis direction (Z-axis) direction may be provided.

The focus adjusting unit 400 may include a carrier 300 accommodating the lens module 200, the lens module 200, and a magnet 410 and a coil 430 generating a driving force to move the lens module 200 and the carrier 300 in the optical axis direction (Z-axis).

The magnet 410 may be mounted on the carrier 300. For example, the magnet 410 may be mounted on one surface of the carrier 300.

The coil 430 may be provided in a substrate 600. For example, the coil 430 may be a copper foil pattern stacked and embedded in one surface of the substrate 600. The substrate 600 may be mounted on a side surface of the housing 120 such that the magnet 410 and the coil 430 face each other in a direction perpendicular to the optical axis (Z-axis).

The magnet 410 may be a moving member mounted on the carrier 300 and moving together with the carrier 300 in the optical axis (Z-axis) direction, and the coil 430 may be a fixing member fixed to the housing 120.

When power is applied to the coil 430, the carrier 300 may be moved in the optical axis (Z-axis) direction by an electromagnetic effect between the magnet 410 and the coil 430.

Since the lens module 200 is accommodated in the carrier 300, the lens module 200 may be also moved in the optical axis (Z-axis) direction by the movement of the carrier 300. As described later with reference to FIG. 2, a frame 310 and the lens module 200 are sequentially accommodated in the carrier 300, the frame 310 and the lens module 200 may be also moved in the optical axis (Z-axis) direction by the movement of the carrier 300.

A rolling member B1 may be disposed between the carrier 300 and the housing 120 to reduce friction between the carrier 300 and the housing 120, when the carrier 300 is moved. The rolling member B1 may have a ball form while not limited thereto.

The rolling member B1 may be disposed on both sides of the magnet 410.

A yoke 450 may be disposed to face the magnet 410 in a direction perpendicular to the optical axis (Z-axis). For example, the yoke 450 may be mounted on another surface of the substrate 600. Therefore, the yoke 450 may be disposed to face the magnet 410 with the coil 430 interposed therebetween.

There may be an attractive force between the yoke 450 and the magnet 410 in the direction perpendicular to the optical axis (Z-axis).

Therefore, the rolling member B1 may maintain contact with the carrier 300 and the housing 120 by the attractive force between the yoke 450 and the magnet 410.

In addition, the yoke 450 may also function to focus a magnetic force of the magnet 410. Accordingly, it is possible to prevent a leakage magnetic flux from being generated.

For example, the yoke 450 and the magnet 410 may form a magnetic circuit.

The present example may use a closed loop control method for detecting and feeding back a position of the lens module 200.

For example, a first position measuring unit 480 may be provided for a closed loop control. The first position measuring unit 480 may include a first sensing yoke 460 and a first sensing coil 470, and the first sensing yoke 460 and the first sensing coil 470 may be disposed to face each other. The first position measuring unit 480 will be described later with reference to FIGS. 3 to 5.

Referring to FIG. 2, an optical image stabilization unit 500 of the lens driving device according to one or more examples will be described.

The optical image stabilization unit 500 may be used for correcting an image blurring or a motion blurring due to factors such as a user's hand shaking during an image capturing or motion capturing.

For example, the optical image stabilization unit 500 may compensate for shaking by giving a relative displacement corresponding to the shaking to the lens module 200 when the shaking occurs during the image capturing due to the user's hand shaking, or the like.

As an example, the optical image stabilization unit 500 may move the lens module 200 in a direction perpendicular to the optical axis (Z-axis) to correct the shaking.

The optical image stabilization unit 500 may include the frame 310 guiding movement of the lens module 200, and a plurality of magnets 510a and 520a and a plurality of coils 510b and 520b generating a driving force to move the frame 310 in a direction perpendicular to the optical axis (Z-axis).

The frame 310 and the lens holder 230 may be inserted into the carrier 300 and disposed in the direction of the optical axis (Z-axis), and serve to guide movement of the lens barrel 210.

The frame 310 and the lens holder 230 may have a space into which the lens barrel 210 may be inserted. The lens barrel 210 may be inserted and fixed to the lens holder 230.

In the present example, an overall height of the camera module (height in the optical axis (Z-axis) direction) may be prevented from being increased even when the frame 310 for guiding the movement of the lens barrel 210 is employed when shaking correction occurs.

For example, the frame 310 may have a shape in which two sides of a rectangle are removed, when viewed from the optical axis (Z-axis) direction. Accordingly, the frame 310 may be in a '┐' or '└' shape, when viewed from the optical axis (Z-axis) direction.

The plurality of magnets 510a and 520a may be disposed at positions corresponding to two open sides of the frame 310, respectively. Therefore, a dispositional position of the plurality of magnets 510a and 520a may not be affected by the frame 310, thereby preventing the overall height of the camera module from increasing.

The frame 310 and the lens holder 230 may be moved in the direction perpendicular to the optical axis (Z-axis) with respect to the carrier 300 by the driving force generated by the plurality of magnets 510a and 520a and the plurality of coils 510b and 520b.

Among the plurality of magnets 510a and 520a and the plurality of coils 510b and 520b, a unit of the magnet 510a and a unit of the coil 510b may generate a driving force in a first axis (X-axis) direction perpendicular to the optical axis (Z-axis), and the remaining magnet 520a and the remaining coil 520b may generate a driving force in a second axis (Y-axis) direction perpendicular to the first axis (X-axis). That is, corresponding ones of the plurality of magnets 510a and 520a and the plurality of coils 510b and 520b may generate the driving force in a direction facing each other.

Here, the second axis (Y-axis) may mean an axis perpendicular to both the optical axis (Z-axis) and the first axis (X-axis).

The plurality of magnets 510a and 520a may be disposed to be orthogonal to each other in a plane perpendicular to the optical axis (Z-axis), and the plurality of coils 510b and 520b may be also disposed to be orthogonal to each other in a plane perpendicular to the optical axis (Z-axis).

The plurality of magnets 510a and 520a may be mounted on the lens holder 230. For example, the plurality of magnets 510a and 520a may be mounted on side surfaces of the lens holder 230, respectively. The side surfaces of the lens holder 230 may include a first surface and a second surface, perpendicular to each other, and any one of the plurality of magnets 510a and 520a may be disposed on the first surface of the lens holder 230, while the remaining magnet is disposed on the second surface of the lens holder 230.

The plurality of coils 510b and 520b may be a copper foil pattern stacked and embedded in the substrate 600.

The plurality of magnets 510a and 520a may be moving members moving together with the lens holder 230 in a direction perpendicular to the optical axis (Z-axis), and the plurality of coils 510b and 520b may be fixing members fixed to the housing 120.

Meanwhile, in the examples described herein, a plurality of ball members for supporting the frame 310 and the lens holder 230 may be provided. The plurality of ball members may serve to guide the movement of the frame 310, the lens holder 230 and the lens barrel 210, in the shaking correction process. In addition, the plurality of ball members may also serve to maintain a space between the carrier 300, the frame 310, and the lens holder 230.

The plurality of ball members may include a first ball member B2 and a second ball member B3.

The first ball member B2 may guide the movement of the frame 310, the lens holder 230, and the lens barrel 210 in the second axis (Y-axis) direction, and the second ball member B3 may guide the movement of the lens holder 230 and the lens barrel 210 in the first axis (X-axis) direction.

For example, the first ball member B2 may roll in the second axis (Y-axis) direction when a driving force is generated in the second axis (Y-axis) direction. Accordingly, the first ball member B2 may guide the movement of the frame 310, lens holder 230, and the lens barrel 210 in the second axis (Y-axis) direction.

In addition, the second ball member B3 may roll in the first axis (X-axis) direction when a driving force is generated in the first axis (X-axis) direction. Accordingly, the second ball member B3 may guide the movement of the lens holder 230 and the lens barrel 210 in the first axis (X-axis) direction.

The first ball member B2 may include a plurality of ball members disposed between the carrier 300 and the frame 310, and the second ball member B3 may include a plurality of ball members disposed between the frame 310 and the lens holder 230.

A first guide groove unit 301 for accommodating the first ball member B2 may be formed in at least one of surfaces of the carrier 300 and the frame 310 facing each other in the optical axis (Z-axis) direction. The first guide groove unit 301 may include a plurality of guide grooves corresponding to the plurality of ball members of the first ball member B2.

The first ball member B2 may be accommodated in the first guide grove unit 301 to be sandwiched between the carrier 300 and the frame 310.

The movement of the first ball member B2 in the optical axis (Z-axis) and the first axis (X-axis) directions may be restricted in the state of being accommodated in the first guide groove unit 301, and may be moved only in the second axis (Y-axis) direction. For example, the first ball member B2 may roll only in the second axis (Y-axis) direction.

For this, a plane shape of each of plurality of guide grooves of the first guide groove unit 301 may be a rectangle having a length in the second axis (Y-axis) direction greater than a width in the first axis (X-axis) direction.

A second guide groove unit 311 for accommodating the second ball member B3 may be formed in at least one of surfaces of the frame 310 and the lens holder 230 facing each other in the optical axis (Z-axis) direction. The second guide groove unit 311 may include a plurality of guide grooves corresponding to the plurality of ball members of the second ball member B3.

The second ball member B3 may be accommodated in the second guide groove unit 311 to be sandwiched between the frame 310 and the lens holder 230.

The movement of the second ball member B3 in the optical axis (Z-axis) and the second axis (Y-axis) directions may be restricted in the state of being accommodated in the second guide groove unit 311, and may be moved only in the first axis (X-axis) direction. For example, the second ball member B3 may roll only in the first axis (X-axis) direction.

For this, a plane shape of each of the plurality of guide grooves of the second guide groove unit 311 may be a rectangle having a length in the first axis (X axis) direction.

In the examples described herein, a third ball member B4 for supporting movement of the lens holder 230 between the carrier 300 and the lens holder 230 may be provided. The third ball member B4 may be in contact with the carrier 300 and the lens holder 230, respectively.

The third ball member B4 may guide both the movement of the lens holder 230 in the first axis (X-axis) direction and the movement of the lens holder 230 in the second axis (Y-axis) direction.

For example, the third ball member B4 may roll in the first axis (X-axis) direction when a driving force is generated in the first axis (X-axis) direction. Accordingly, the third ball member B4 may guide the movement of the lens holder 230 in the first axis (X-axis) direction.

In addition, the third ball member B4 may roll in the second axis (Y-axis) direction when a driving force is generated in the second axis (Y-axis) direction. Accordingly, the third ball member B4 may guide the movement of the lens holder 230 in the second axis (Y-axis) direction.

The second ball member B3 and the third ball member B4 may support the lens holder 230 by each being in contact therewith.

A third guide groove unit 302 for accommodating the third ball member B4 may be formed in at least one of surfaces of the carrier 300 and the lens holder 230 facing each other in the optical axis (Z-axis) direction.

The third ball member B4 may be accommodated in the guide groove unit 302 to be sandwiched between the carrier 300 and the lens holder 230.

The movement of the third ball member B4 in the direction of the optical axis (Z-axis) direction may be restricted in the state of being accommodated in the third guide groove unit 302, and the third ball member B4 may roll in the first axis (X-axis) direction and the second axis (Y-axis) direction.

For this, a plane shape of the third guide groove unit 302 may be circular. Therefore, the plane shape of the third guide groove unit 302 and the plane shapes of the first guide groove unit 301 and the second guide groove unit 311 may be different from each other.

The first ball member B2 may roll in the second axis (Y-axis) direction, the second ball member B3 may roll in the first axis (X-axis) direction, and the third ball member B4 may roll in the first axis (X-axis) and the second axis (Y-axis) directions.

Therefore, the plurality of ball members for supporting the optical stabilization unit 500 of the present disclosure may differ in a degree of freedom.

Here, the degree of freedom may mean the number of independent variables required to represent a motion state of an object in a three-dimensional coordinate system.

Generally, the degree of freedom of an object in the three-dimensional coordinate system may be 6. The motion of an object may be expressed by three orthogonal coordinated systems and three rotational coordinate systems.

For example, in the three-dimensional coordinate system, an object may translate along each axis (X-axis, Y-axis, and Z-axis) and rotate based on each axis (X-axis, Y-axis, and Z-axis).

In the present specification, the degree of freedom may mean that when the optical stabilization unit 500 is moved by a driving force generated in a direction perpendicular to the optical axis (Z-axis) when power is applied to the shaking correction unit 500, the number of independent variables required to indicate the movement of the first ball member B2, the second ball member B3, and the third ball member B4.

For example, the third ball member B4 may roll along two axes (first axis (X-axis) and second axis (Y-axis)) by the driving force generated in a direction perpendicular to the optical axis (Z-axis), and the first ball member B2 and the second ball member B3 may roll along one axis (first axis (X-axis) or the second axis (Y-axis)).

Therefore, the degree of freedom of the third ball member B4 may be greater than the degree of freedom of the first ball member B2 and the second ball member B3.

When the driving force is generated in the second axis (Y-axis) direction, the frame 310, the lens holder 230, and the lens barrel 210 may move together in the second axis (Y-axis) direction.

Here, the first ball member B2 and the third ball member B4 may roll along the second axis (Y-axis). In this case, the movement of the second ball member B3 may be restricted.

In addition, when the driving force is generated in the first axis (X-axis) direction, the lens holder 230 and the lens barrel 210 may move in the first axis (X-axis) direction.

Here, the second ball member B3 and the third ball member B4 may roll along the first axis (X-axis). In this case, the movement of the first ball member B2 may be restricted.

The present disclosure may use a closed loop control method in which the position of the lens barrel 210 is detected and fed back in the shaking correction process.

Therefore, a second position measuring unit for a closed loop control may be provided.

The second position measuring unit may include a second sensing yoke 530a and a second sensing coil 530b.

The second sensing yoke 530a may be attached to the lens holder 230, and the sensing coil 530b may be disposed to face the second sensing yoke 530a. The second sensing coil 530b may include a plurality of coils, and the plurality of coils may be a copper foil pattern embedded in the substrate 600.

The second sensing yoke 530a and the second sensing coil 530b may be disposed to face each other in a direction perpendicular to the optical axis (Z-axis).

When an alternating current is applied to the second sensing coil 530b, a magnetic field of the second sensing coil 530b may induce an eddy current in the second sensing yoke 530a. Here, the second sensing yoke 530a may be provided as a conductor and/or a magnetic body.

Inductance of the second sensing coil 530b may be changed by the eddy current. An amount of change in the inductance of the second sensing coil 530b may be affected by a distance between the second sensing coil 530b and the second sensing yoke 530a.

The second sensing yoke 530a may be attached to the lens holder 230, and the lens holder 230 may be moved along the first axis (X-axis) and the second axis (Y-axis) directions, perpendicular to the optical axis (Z-axis), together with the lens barrel 210, such that the position of the lens barrel 210 in the first axis (X-axis) and the second axis (Y-axis) direction may be measured from the change in the inductance of the second sensing coil 530b.

When the second sensing coil 530b includes three coils, one coil may be a reference coil for the change in inductance, and two coils may be detection coils for detecting a position of the lens barrel 210 in the first axis (X-axis) and the second axis (Y-axis) directions.

The reference coil may be disposed not to face the second sensing yoke 530a, and the two detection coils may be disposed to face the second sensing yoke 530a.

When the position of the lens barrel 210 is measured through the change in inductance of the two detection coils, since the change in inductance of the coil is affected by disturbance, an influence of the disturbance such as a temperature, or the like may be removed by referring to the change in inductance of the reference coil.

In the examples described herein, a plurality of yokes 510c and 520c may be provided such that respective components of the optical stabilization unit 500 and the first to third ball members B2, B3, and B4 are kept in contact with each other.

The plurality of yokes 510c and 520c may be fixed to the carrier 300, and may be disposed to face the plurality of magnets 510a and 520a in the optical axis (Z-axis) direction.

Therefore, an attractive force may be generated between the plurality of yokes 510c and 520c and the plurality of magnets 510a and 520a.

The lens holder 230 and the frame 310 may be pressed in a direction toward the plurality of yokes 510c and 520c by the attractive force between the plurality of yokes 510c and 520c and the plurality of magnets 510a and 520a, such that the frame 310 and the lens holder 230 may maintain contact with the first to third ball members B2, B3, and B4, respectively.

The plurality of yokes 510c and 520c may be materials capable of generating an attractive force with the plurality of magnets 510a and 520a. For example, the plurality of yokes 510c and 520c may be provided as a magnetic body.

In the examples described herein, the plurality of yokes 510c and 520c may be provided such that the frame 310 and the lens holder 230 are in contact with the first to third ball members B2, B3, and B4, respectively. A stopper 320 may be provided to prevent the first to third ball members B2, B3, and B4, the frame 310, and the lens holder 230 from being released to the outside of the carrier 300.

The stopper 320 may be coupled to the carrier 300 to cover at least a portion of the upper surface of the lens holder 230.

Figure 3:
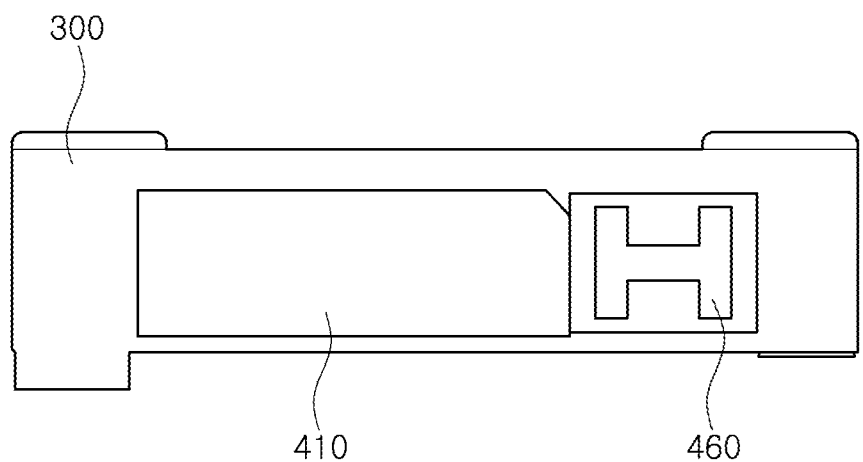
FIG. 3 is a side view of a carrier of a camera module according to one or more examples.
Figure 4:
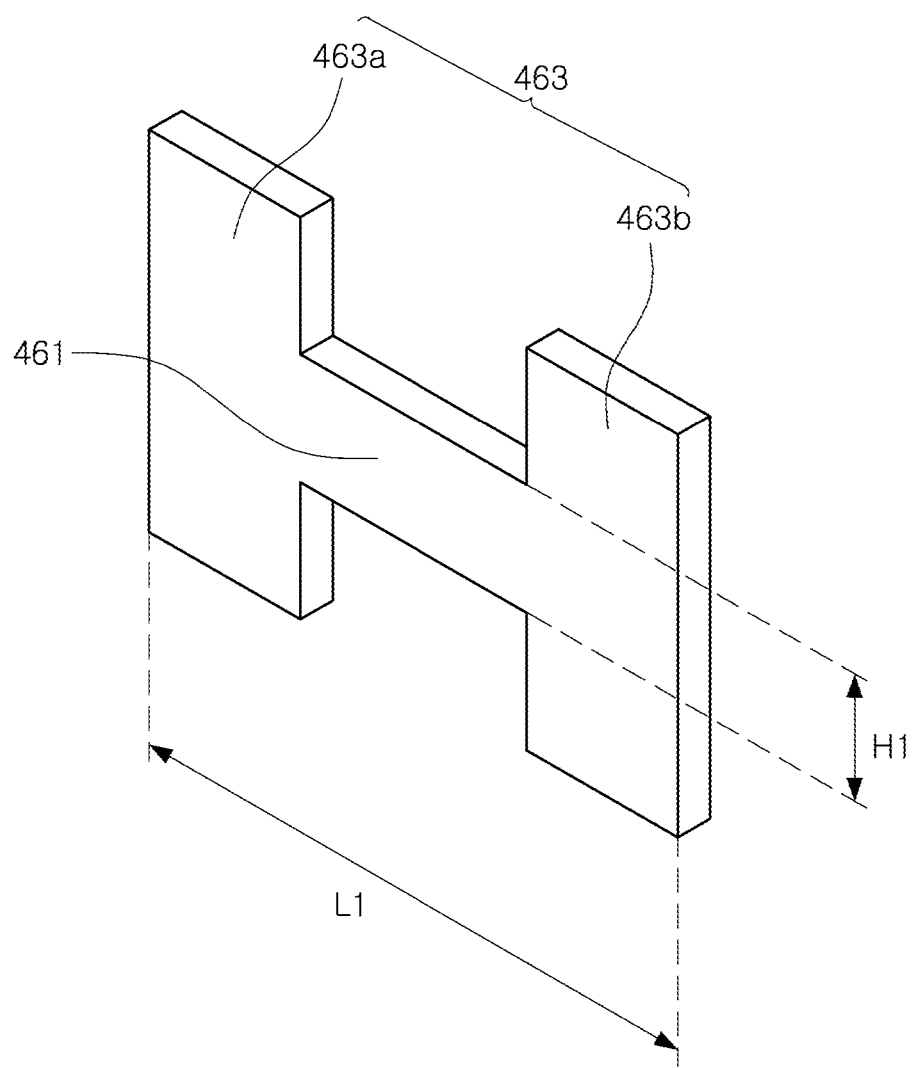
FIG. 4 is a perspective view of a first sensing yoke according to one or more examples.
Figure 5:
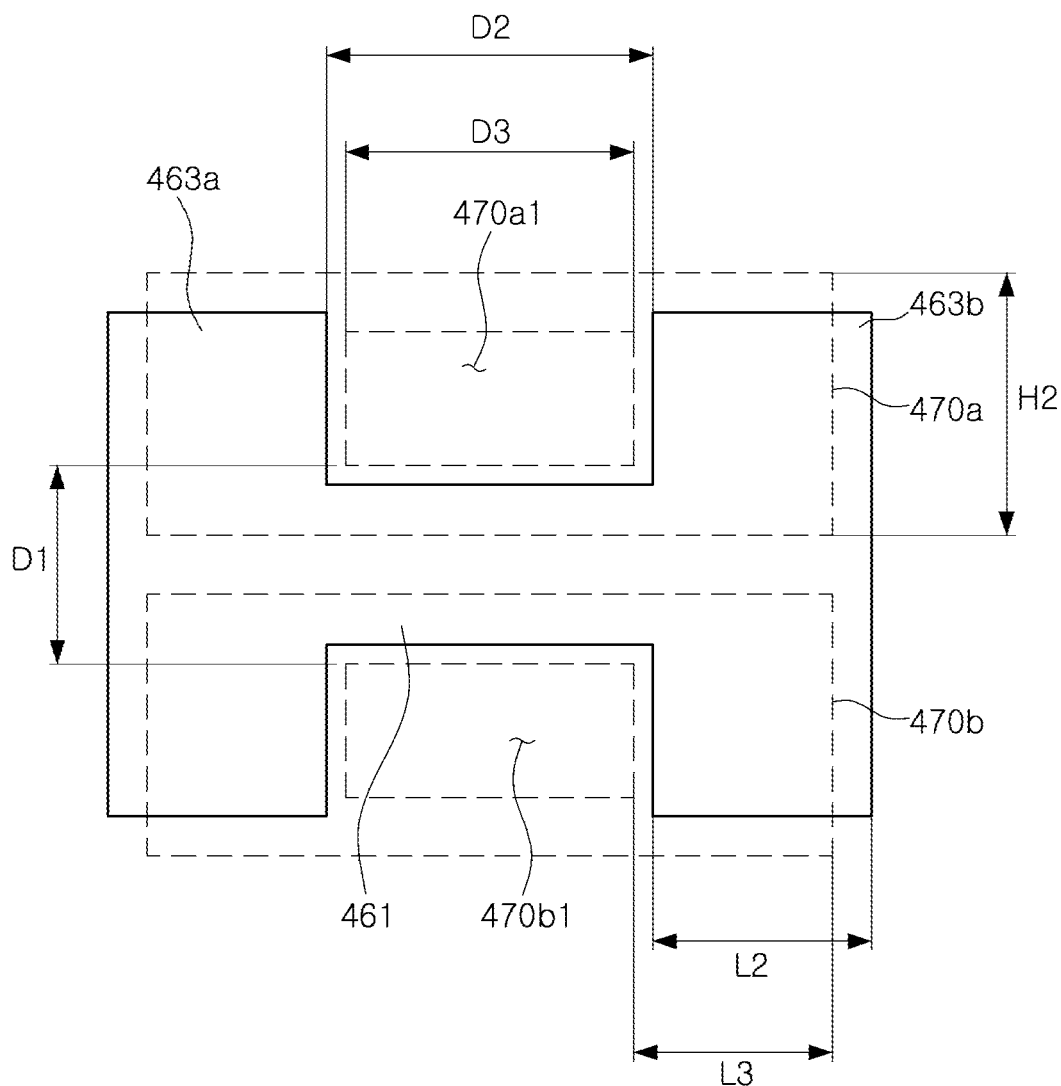
FIG. 5 is a conceptual diagram of a first sensing yoke and a first sensing coil provided in a camera module according to one or more examples.

FIG. 3 is a side view of a carrier of a camera module according to one or more examples, FIG. 4 is a perspective view of a first sensing yoke, and FIG. 5 is a conceptual diagram of a first sensing yoke and a first sensing coil provided to a cameral module according to one or more examples.

Referring to FIGS. 3 to 5, a camera module 100 according to one or more examples may include a first position measuring unit 480 to measure a position of the lens module 200 in the optical axis (Z-axis) direction. The first position measuring unit 480 may include a first sensing yoke 460 and a first sensing coil 470.

The first sensing yoke 460 may be attached to the carrier 300. For example, the first sensing yoke 460 may be attached on one surface of the carrier 300 to which the magnet 410 is attached. The magnet 410 and the first sensing yoke 460 may be disposed on one surface of the carrier 300 so as to be spaced apart from each other by a predetermined distance.

The first sensing coil 470 may be a copper foil pattern stacked and embedded in the substrate 600.

The first sensing yoke 460 and the first sensing coil 470 may be disposed to face each other in a direction perpendicular to the optical axis (Z-axis).

When an alternating current is applied to the first sensing coil 470, a magnetic field of the first sensing coil 470 may induce an eddy current in the first sensing yoke 460. Here, the first sensing yoke 460 may be provided as a conductor and/or a magnetic body. For example, the first sensing yoke 460 may be made of stainless steel (SUS).

The inductance of the first sensing coil 470 may be changed by the eddy current. The amount of change in inductance of the first sensing coil 470 may be affected by the distance between the first sensing coil 470 and the first sensing yoke 460.

The first sensing yoke 460 may be attached to the carrier 300, and the carrier 300 may be moved in the optical axis (Z-axis) direction, together with the lens barrel 210, such that the position of the lens barrel 210 in the optical axis (Z-axis) direction from the change in inductance of the first sensing coil 470 may be measured.

For example, the first sensing coil 470 may include a first coil 470a and a second coil 470b, disposed in the optical axis (Z-axis) direction. In the present specification, the first sensing coil 470 includes two coils 470a and 470b disposed in the optical axis (Z-axis) direction, but only needs to be plural, and the number of sensing coils does not limit the spirit of the present disclosure.

When the first sensing yoke 460 moves in the optical axis (Z-axis) direction, the position of the lens barrel 210 in the optical axis (Z-axis) direction may be sensed by using a signal difference generated in the first coil 470a and the second coil 470b.

However, in recent years, the size of the camera module has been miniaturized. Accordingly, the size of the first sensing coil 470 (for example, the number of windings of the coil) and the size of the first sensing yoke 460 may be limited.

However, as the size of the first sensing coil 470 and the first sensing yoke 460 has decreased, the amount of change in inductance may be also smaller, and sensing sensitivity may be lowered, thereby deteriorating the control performance of the camera module.

However, a camera module 100 according to the examples described herein may be configured to improve the sensing sensitivity.

Referring to FIGS. 4 and 5, a first sensing yoke 460 of the camera module 100 according to one or more examples may include a body unit 461 and an extension unit 463 extending in the optical axis (Z-axis) direction from the body unit 461. The extension unit 463 may extend both upwardly and downwardly in the optical axis (Z-axis) direction with respect to the body unit 461.

The extension unit 463 may include a first extension unit 463a extending from one side of the body unit 461 in the optical axis (Z-axis) direction and a second extension unit 463b extending from the other side of the body unit 461 in the optical axis (Z-axis) direction. Each of the body unit 461 and the extension unit 462 may be in the form of a rectangular plate.

A height H1 of the body unit 461 (a height in the optical axis (Z-axis) direction) may be different from a length of the body unit 461 (a length perpendicular to the optical axis (Z-axis) direction). For example, the height H1 of the body unit 461 may be formed to be smaller than the length L1 of the body unit 461.

The height H1 of the body unit 461 may be different from a height H2 of the first coil 470a (a height in the optical axis (Z-axis) direction). For example, the height H1 of the body unit 461 may be formed to be less than half (H2/2) of the height H2 of the first coil 470a. In addition, the height H1 of the body unit 461 may be formed to be less than half (H2/2) of the height H2 of the second coil 470b.

Referring to FIGS. 3 to 5, the first sensing yoke 460 may have a letter 'H' shape. For example, the first sensing yoke may be in the shape of a letter 'H' when viewed in a direction perpendicular to the optical axis (Z-axis) direction.

There is a limitation in the size of the first sensing yoke 460 in accordance with the miniaturization of the camera module, which results in a problem that the sensing sensitivity is weakened. For example, when the first sensing yoke 460 is in a general plate shape, when the size of the first sensing yoke 460 is reduced, an area of the first sensing yoke 460 and the first sensing coil 470 facing each other may be reduced.

Particularly, since the first sensing coil 470 has a hollow unit, the area of the first sensing yoke 460 and the first sensing coil facing each other while the first sensing yoke 460 is moved in the optical axis direction, may be changed. Such a change in the area may cause a change in the inductance of the first sensing coil 470, thereby reducing the accuracy of position sensing.

However, in the examples disclosed herein, by forming extension units 463 on both sides of the body unit 461, factors affecting the change in the inductance of the first sensing coil 470 while relatively reducing the height of the body unit 461 may be removed. Therefore, the accuracy of the position sensing may be improved.

Referring to FIG. 5, a portion of the first sensing yoke 460 may be disposed to face the first coil 470a, and another portion of the first sensing yoke 460 may be disposed to face the second coil 470b.

Here, the height H1 of the body unit 461 of the first sensing yoke 460 may be formed to be smaller than a distance D1 (a spacing distance in the optical axis (Z-axis) direction) between a hollow unit 470a1 of the first coil 470a and a hollow unit 470b1 of the second coil 470b.

When the first sensing yoke 460 is moved in the optical axis (Z-axis) direction, the first extension unit 463a of the first sensing yoke 460 may be configured not to face the hollow unit 470a1 of the first coil 470a and the hollow unit 470b1 of the second coil 470b. In addition, the second extension unit 463b of the first sensing yoke 460 may be also configured not to face the hollow unit 470a1 of the first coil 470a and the hollow unit 470b1 of the second coil 470b.

For example, the distance D2 between the first extension unit 463a and the second extension unit 463b (spacing distance in a direction perpendicular to the optical axis (Z-axis) direction) may be formed to be greater than the length D3 of the hollow unit 470a1 of the first coil 470a (length in a direction perpendicular to the optical axis (Z-axis) direction).

In addition, the distance D2 between the first extension unit 463a and the second extension unit 463b (spacing distance in the direction perpendicular to the optical axis (Z-axis) direction) may be formed to be larger than the distance D3 of the hollow unit 470b1 of the second coil 470b (length in the direction perpendicular to the optical axis (Z-axis) direction).

The length L2 of the first extension unit 463a (length in the direction perpendicular to the optical axis (Z-axis) direction) and the length L2 of the second extension unit 463b (length in the direction perpendicular to the optical axis (Z-axis) direction) may be formed to be longer than a length L3 between an inner side end and an outer side end of the first coil 470a, respectively.

In addition, the length L2 of the first extension unit 463a (length in the direction perpendicular to the optical axis (Z-axis) direction and the length L2 of the second extension unit 463b (length in the direction perpendicular to the optical axis (Z-axis) direction) may be formed to be longer than the length L3 between the inner side end and the outer side end of the second coil 470b, respectively.

The sensing sensitivity may be improved by the body unit 461 and the extension unit 463 of the first sensing yoke 460, and accordingly, the position of the lens barrel 210 may be more accurately measured.

Figure 6:
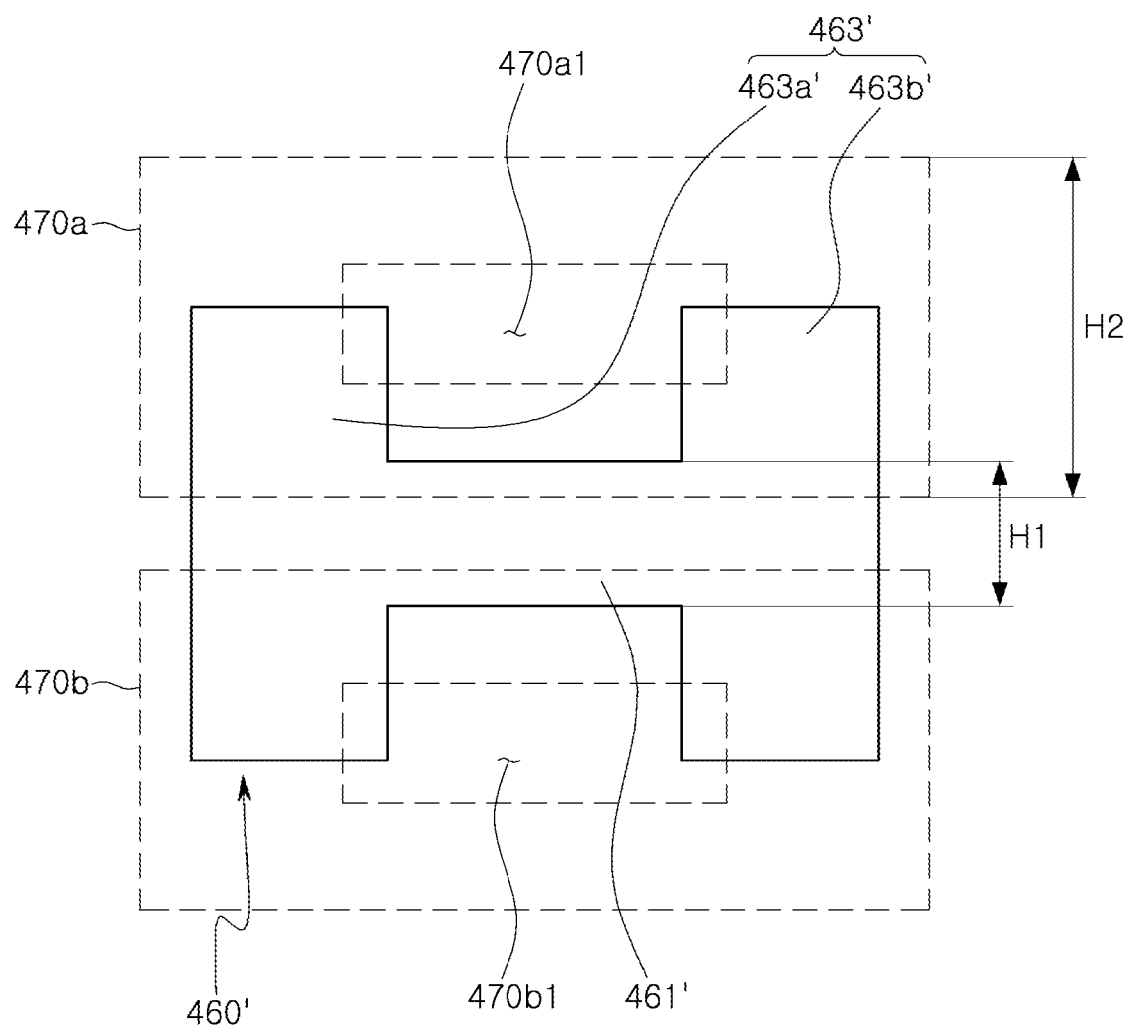
FIG. 6 is a conceptual diagram of a first sensing yoke and a first sensing coil provided in a camera module according to one or more other examples.

FIG. 6 is a conceptual diagram of a first sensing yoke and a first sensing coil provided in a camera module according to one or more other examples.

Referring to FIG. 6, a first sensing yoke 460' may include a body unit 461' and an extension unit 463' extending from the body unit 461' in the optical axis (Z-axis) direction. The extension unit 463' may extend both upwardly and downwardly in the optical axis (Z-axis) direction with respect to the body unit 461'.

The extension unit 463' may include a first extension unit 463a' extending from one side of the body unit 461' in the optical axis (Z-axis) direction, and a second extension unit 463b' extending from another side of the body unit 461' in the optical axis (Z-axis) direction. The body unit 461' and the extension unit 463' may each have the form of a rectangular plate. The first extension unit 463a' and the second extension unit 463b' may each have the form of a rectangular plate.

The height H1 of the body unit 461' (height in the optical axis (Z-axis) direction) may be different from the height H2 of the first coil 470a (height in the optical axis (Z-axis) direction). For example, the height H1 of the body unit 461' may be formed to be less than half (H2/2) of the height H2 of the first coil 470a. In addition, the height H1 of the body unit 461' may be formed to be less than half (H2/2) of the height H2 of the second coil 470b.

Referring to FIG. 6, the first sensing yoke 460' may have a letter 'H' shape.

One portion of the first sensing yoke 460' may be disposed to face the first coil 470a, and another portion of the first sensing yoke 460' may be disposed to face the second coil 470b.

Here, the height H1 of the body unit 461' of the first sensing yoke 460' may be formed to be smaller than the distance D1 (spacing distance in the optical axis (Z-axis) direction) between the hollow unit 470a1 of the first coil 470a and the hollow unit 470b1 of the second coil 470b.

A portion of the first extension unit 463a' of the first sensing yoke 460' may be disposed to face the hollow unit 470a1 of the first coil 470a and the hollow unit 470b1 of the second coil 470b. In addition, a portion of the second extension unit 463b' of the first sensing yoke 460' may be also disposed to face the hollow unit 470a1 of the first coil 470a and the hollow unit 470b1 of the second coil 470b.

In this case, in the process in which the first sensing yoke 460' is moved in the optical axis (Z-axis) direction, the area of the first extension unit 463a' facing the hollow unit 470a1 of the first coil 470a may be less than half the area of the first extension unit 463a' (a portion extending upwardly in the optical axis (Z-axis) direction from the body unit 461').

In the process in which the first sensing yoke 460' is moved in the optical axis (Z-axis) direction, the area of the first extension unit 463a' facing the hollow unit 470b1 of the second coil 470b may be less than half the area of the first extension unit 463a' (a portion extending downwardly in the optical axis (Z axis) direction from the body unit 461'.

In other words, the area of the first extension unit 463a' facing the hollow unit 470a1 of the first coil 470a and the hollow unit 470b1 of the second coil 470b may be less than half the area of the first extension unit 463a' (a portion extending upwardly and downwardly in the optical axis (Z-axis) direction from the body unit 461').

The area of the second extension unit 463b' facing the hollow unit 470a1 of the first coil 470a may be less than half the area of the second extension unit 463b' (a portion extending upwardly in the optical axis (Z-axis) direction from the body unit 461').

In addition, the area of the second extension unit 463b' facing the hollow unit 470b1 of the second coil 470b may be less than half the area of the second extension unit 463b' (a portion extending downwardly in the optical axis (Z-axis) direction from the body unit 461').

In other words, the area of the second extension unit 463b' facing the hollow unit 470a1 of the first coil 470a and the hollow unit 470b1 of the second coil 470b may be less than half the area of the second extension unit 463b' (a portion extending upwardly and downwardly in the optical axis (Z-axis) direction from the body unit 461').

Referring to FIGS. 7A and 7B, the camera module 100, according to the examples described herein, may be a mobile device, such as a portable electronic device 1, and further include a display unit 10, wherein the camera module 100 is installed as a front camera of the portable electronic device 1 along with the display unit 10 or as a back camera on a side of the portable electronic device 1 other than a side with the display unit 10. As described in the various examples, an electrical signal converted by an image sensor 710 (FIG. 2) of the camera module 100 may be output as an image via the display unit 10 of the portable electronic device 1.

According to the examples described above, the camera module according to one or more examples may precisely measure the position of the lens module while miniaturizing the camera module, thereby improving the control performance. According to the examples described above, the miniaturized camera module according to one or more examples may miniaturize the portable electronic device.

As set forth above, a camera module according to an embodiment of the present disclosure may precisely measure the position of the lens module while miniaturizing the camera module, thereby improving the control performance.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of this disclosure is defined not by the detailed description, but by the claims and their equivalents, and all variations within the scope of the claims and their equivalents are to be construed as being included in this disclosure.

What is claimed is:

1. A camera module comprising:
   a carrier accommodating a lens module;
   a housing accommodating the lens module and the carrier;
   a focus adjusting unit configured to move the lens module and the carrier in an optical axis direction; and
   a position measuring unit comprising a sensing yoke disposed on the carrier and a sensing coil facing the sensing yoke,
   wherein the sensing yoke comprises a body unit and an extension unit extending in the optical axis direction from the body unit.

2. The camera module of claim 1, wherein the sensing yoke is made of stainless steel (SUS).

3. The camera module of claim 1, wherein a height of the body unit in the optical axis direction is less than a length of the body unit in a direction perpendicular to the optical axis direction.

4. The camera module of claim 1, wherein the sensing coil comprises a first coil and a second coil disposed along the optical axis direction.

5. The camera module of claim 4, wherein a height of the body unit in the optical axis direction is less than a spacing distance between a hollow unit of the first coil and a hollow unit of the second coil in the optical axis direction.

6. The camera module of claim 4, wherein a height of the body unit in the optical axis direction is less than half a height of at least one of the first coil and the second coil in the optical axis direction.

7. The camera module of claim 4, wherein the extension unit comprises a first extension unit extending from one side of the body unit in the optical axis direction, and a second extension unit extending from another side of the body unit in the optical axis direction.

8. The camera module of claim 7, wherein a distance between the first extension unit and the second extension unit is greater than a length of at least one of a hollow unit of the first coil and a hollow unit of the second coil in a direction perpendicular to the optical axis direction.

9. The camera module of claim 7, wherein a length of the first extension unit in a direction perpendicular to the optical axis and a length of the second extension unit in a direction perpendicular to the optical axis are each greater than at least one of a length between an inner side end and an outer side end of the first coil and a length between an inner side end and an outer side end of the second coil.

10. The camera module of claim 7, wherein a portion of the first extension unit and a portion of the second extension unit are disposed to face a hollow unit of the first coil and a hollow unit of the second coil.

11. The camera module of claim 1, wherein when viewed from a direction perpendicular to the optical axis direction, the sensing yoke has an 'H' shape.

12. A portable electronic device, comprising:
the camera module of claim 1 further comprising an image sensor configured to convert light incident through a lens barrel disposed in the lens module to an electrical signal; and
a display unit disposed on a surface of the portable electronic device to display an image based on the electrical signal.

13. A camera module comprising:
a carrier accommodating a lens module;
a housing accommodating the lens module and the carrier;
a focus adjusting unit comprising a magnet disposed on the carrier and a coil disposed to face the magnet; and
a position measuring unit comprising a sensing yoke disposed on the carrier and a sensing coil disposed to face the sensing yoke,
wherein the sensing coil comprises a first coil and a second coil disposed along an optical axis direction,
wherein the sensing yoke comprises a body unit and an extension unit extending from one side and another side of the body unit in the optical axis direction, respectively, and
wherein a portion of the extension unit is disposed to face the first coil, and another portion of the extension unit is disposed to face the second coil.

14. The camera module of claim 13, wherein a height of the body unit in the optical axis direction is less than half a height of at least one of the first coil and the second coil in the optical axis direction.

15. The camera module of claim 13, wherein the extension unit comprises a first extension unit extending from the one side of the body unit in the optical axis direction and a second extension unit extending from the other side of the body unit in the optical axis direction, and
a portion of the first extension unit and a portion of the second extension unit are each disposed to face a hollow unit of the first coil and a hollow unit of the second coil.

16. The camera module of claim 13, wherein an area of the first extension unit facing a hollow unit of the first coil and a hollow unit of the second coil is less than half the area of the first extension unit, and
an area of the second extension unit facing the hollow unit of the first coil and the hollow unit of the second coil is less than half the area of the second extension unit.

17. The camera module of claim 13, wherein the camera module is a portable electronic device, further comprising:
an image sensor configured to convert light incident through a lens barrel disposed in the lens module to an electrical signal; and
a display unit disposed on a surface of the portable electronic device to display an image based on the electrical signal.

18. A portable electronic device, comprising:
a lens module movable in a first direction;
an image sensor configured to convert light incident through a lens barrel disposed in the lens module to an electrical signal;
a display unit disposed on a surface of the portable electronic device to display an image based on the electrical signal;
a sensing yoke disposed on the lens module; and
a sensing coil disposed to face the sensing yoke,
wherein the sensing yoke comprises:
a body unit extending in a second direction perpendicular to the first direction; and
an extension unit extending from the body unit in the first direction.

19. The portable electronic device of claim 18, wherein the lens barrel comprises an optical axis and one of the first direction and the second direction is in the optical axis direction.

20. The portable electronic device of claim 18, wherein the extension unit comprises a first extension unit on one side of the body unit and another extension unit spaced apart in the second direction from the first extension unit on another side of the body unit, and
wherein the sensing coil comprises a first coil and a second coil disposed along the first direction.

* * * * *